US006719425B2

United States Patent
Conner

(10) Patent No.: US 6,719,425 B2
(45) Date of Patent: Apr. 13, 2004

(54) ULTRA-LIGHT, HINGELESS PLASTIC EYEGLASS FRAME

(75) Inventor: William A. Conner, San Diego, CA (US)

(73) Assignee: MicroVision Optical, Inc., San Diego, CA (US)

( * ) Notice: Subject to any disclaimer, the term of this patent is extended or adjusted under 35 U.S.C. 154(b) by 82 days.

(21) Appl. No.: 10/099,401

(22) Filed: Mar. 15, 2002

(65) Prior Publication Data

US 2003/0174277 A1 Sep. 18, 2003

(51) Int. Cl.$^7$ ................................................. G02C 5/14
(52) U.S. Cl. ....................... 351/111; 351/114; 351/121; 351/153; 16/228
(58) Field of Search ................................ 351/111, 113, 351/114, 116–119, 121, 123, 124, 133, 134, 136–138, 153, 110; 16/228

(56) References Cited

U.S. PATENT DOCUMENTS

| 5,442,037 A | * | 8/1995 | Lee et al. | 528/301 |
| 5,737,055 A | * | 4/1998 | Dittmeier | 351/138 |
| 6,059,411 A | * | 5/2000 | Moody | 351/118 |
| 6,074,058 A | | 6/2000 | Anger | |
| 6,241,353 B1 | | 6/2001 | Anger | |
| 6,511,174 B1 | * | 1/2003 | Rossin | 351/119 |
| 2003/0058402 A1 | * | 3/2003 | Conner | 351/110 |
| 2003/0133071 A1 | * | 7/2003 | Ahn | 351/110 |

FOREIGN PATENT DOCUMENTS

| EP | 0 907 094 | * | 4/1999 | |
| FR | 2 785 058 | * | 4/2000 | |
| JP | 9-90288 | * | 4/1997 | 351/123 |
| WO | WO 98/26323 | * | 6/1998 | 351/111 |

* cited by examiner

Primary Examiner—Huy Mai
(74) Attorney, Agent, or Firm—Rob L. Phillips; Quirk & Tratos

(57) ABSTRACT

Herein disclosed is a multiple part eyeglass frame for rimless eyeglasses manufactured from plastic having properties which withstand the constant flexing associated with eyeglasses. The present invention is especially useful in situations where a conventional temple hinge is not used. The frame is highly effective for absorbing stresses on eyeglass lenses at attachment points of the temple members. Temples of the present invention are formed of two individual pieces allowing a temple length to be adjusted. The temple pieces are fabricated, such that when joined, the resulting temple follows the normal curvature of a wearer's head. The present invention incorporates a plastic nose bridge with one or more posts as attachment means for a replaceable nose pad bridge unit. Additionally, means for adjusting the length of the temple members is provided.

31 Claims, 2 Drawing Sheets

ULTRA-LIGHT, HINGELESS PLASTIC EYEGLASS FRAME

FIELD OF THE INVENTION

The present invention is directed to eyeglass frames. More particularly, eyeglass frames having hinge-less temples fabricated of light-weight, flexible and durable memory plastic and a nose bridge member able to receive interchangeable nose pad units.

BACKGROUND OF THE INVENTION

A common feature associated with all forms of eyeglasses and sunglasses is that their weight is borne primarily on nose pads while temple earpieces retain the eyeglasses in position. After a number of hours, the pressure on a wearer's nose, namely where the nose pads rest, results in fatigue causing discomfort for the wearer.

The latest trend in all forms of eyeglasses is to make them lighter in weight thereby reducing the fatigue and discomfort on the nose area. However, often new light-weight designs sacrifice an eyeglasses' structural integrity. In most instances, the light-weight material used for eyeglasses is titanium. However, the cost of titanium frames is out of reach for a great number of eyeglass wearers. Additionally, titanium temples while being flexible, are not as easily shortened as the present plastic temples. The prefabricated temples of the present invention can be shortened while providing an optimum curvature adjacent a wearer's head. In other words, there is no need to re-shape the temple to conform to a wearer's head once they have been shortened since the curvature is prefabricated in plastic frames.

Although titanium is flexible over a long span of the temple, it is rigid in a short span adjacent mounting ends which mount temples to the lenses. Therefore, a large portion of the stresses are borne by the lenses. In other words, once a conventional temple reaches a maximum open position, a temple hinge arrangement prevents the temple from opening farther such that any additional stresses applied to the temple are borne by a lens connected thereto. Only recently has there been a plastic, namely memory plastic, that can handle the continuous flexing and abuse normally inflicted on a pair of eyeglasses. Memory plastic is designed to return to an original location or position after being flexed or displaced. In the present case, eyeglass temples fabricated of memory plastic can be expanded around any number of different size heads and the temples will attempt to "spring" back to their original position. In the case of eyeglass temples, they will apply slight pressure to a wearer's head thereby holding the subject eyeglasses in place. The memory plastic eliminates the need for a temple hinge arrangement.

The present invention describes a new and unique type of eyeglass frame that can be manufactured at reasonable costs from a plastic injection molding process. Moreover, memory plastic is extremely well-suited for use in the fabrication of hinge-less eyeglass frames. The plastic can take a great deal of abuse and remain flexible enough to hold its original shape. The flexibility also helps to relieve some of the stresses placed on the mounting ends. Further, the injection molding process allows several types and styles of nose pad members to be fashioned with various elastomeric properties along with temple earpieces which can be made adjustable in length for the comfort of the wearer. The nose bridge, the nose pad members and the temple earpieces will accommodate and attach to any shape of rimless lenses using conventional screws or a preferred bushing and barbed pin attachment means as described in pending U.S. patent application Ser. No. 09/963,826 by the present inventor, William A. Conner, and incorporated herein by reference.

SUMMARY OF THE INVENTION

The present invention accomplishes its desired objects by providing a very durable and dependable eyeglass frame that may be adjusted for the comfort of the wearer. The frame consists of multiple parts manufactured by an injection molding process using highly flexible memory plastic. The parts consist of a nose bridge unit, a nose pad unit, flexible temple members and earpiece ends. The nose bridge and temple members are attached to the lenses with a conventional nut and screw arrangement or a preferred bushing and barbed pin attachment means. The nose bridge includes a system of two or more mounting posts having an elliptical shape and expanded ends that function as part of a locking means. The mounting posts are not parallel, but are positioned perpendicular to a surface of curvature of the nose bridge thereby angling inwardly to enhance a means of locking the nose pad member into position. Moreover, the angles of the mounting posts on the nose bridge unit are greater than an angle of the nose pad mounting orifices of the nose pad unit thereby creating additional side locking forces on the mounting posts when the parts are joined. The nose pad unit is a one-piece unit able to be manufactured in a number of conventional styles and with a variety of elastromeric properties enhancing the wearer's comfort.

The temples are fabricated of a highly flexible memory plastic eliminating the need for conventional temple hinges located adjacent to eyeglass lenses. The unique flexibility in the plastic allows the temples to be folded for storage without damage. The present invention eliminates the need for a hinge or a hinge screw that inevitably becomes loose and possibly lost. Each temple member consists of two pieces, namely a forward flexible temple member and an earpiece angled down and inward toward the head of the wearer. Preferably, the earpiece angles at approximately fifteen degrees (15°) inward toward the head of the wearer. Of course, the angling degree may vary from fifteen degrees (15°) without departing from the scope of the present invention. The convenience of having the temple members in two pieces is that they can be shortened in length to fit different size heads.

A male anti-rotation end of the forward temple member is inserted into a receiver orifice of the earpiece to form a complete temple. The depth of the receiver orifice that mates with the male anti-rotation end of the forward flexible temple member is equal to, or greater than, the length of the male anti-rotation end. The preferred method of shortening the temple members requires removing a segment of equal length from both the flexible forward temple member, more particularly the anti-rotation member, and the receiver orifice of the earpiece. Alternatively, the temple members are shortened by removing a predetermined length of the receiver orifice only.

An object of the present invention is to produce a light-weight, economical, durable hinge-less temple for eyeglass frames.

Another object of the present invention is to create eyeglass frames without a conventional temple hinge or temple hinge screws which inevitably become loose and lost.

Another object of the present invention is to create a plastic eyeglass frame facilitating the attachment of various nose pad units.

Another object of the present invention is to create an eyeglass frame having length adjustable temple members.

Another object of the present invention is use of a combination of a temple member and matching ear piece which when joined automatically achieves a preferred 15 degree inward angle to conform to a curvature of a wearer's head.

Still another object of the present invention is to create a joint in two-piece temple members of an eyeglass frame that does not catch in a wearer's hair.

Yet another object of the present invention is to create an eyeglass frame that mounts to eyeglass lenses with enough flexibility to prevent cracking of the lenses at the mounting points.

These together with other objects and advantages which will become subsequently apparent reside in the details of the construction and operation as more fully hereinafter described and claimed, reference being had to the accompanying drawings forming a part hereof, wherein like numerals refer to like parts throughout.

BRIEF DESCRIPTION OF THE DRAWING FIGURES

The accompanying drawings, which are incorporated in and form a part of this specification, illustrate embodiments of the invention and together with the description, serve to explain the principles of the invention.

DETAILED DESCRIPTION OF THE PREFERRED EMBODIMENT

Figure 1:
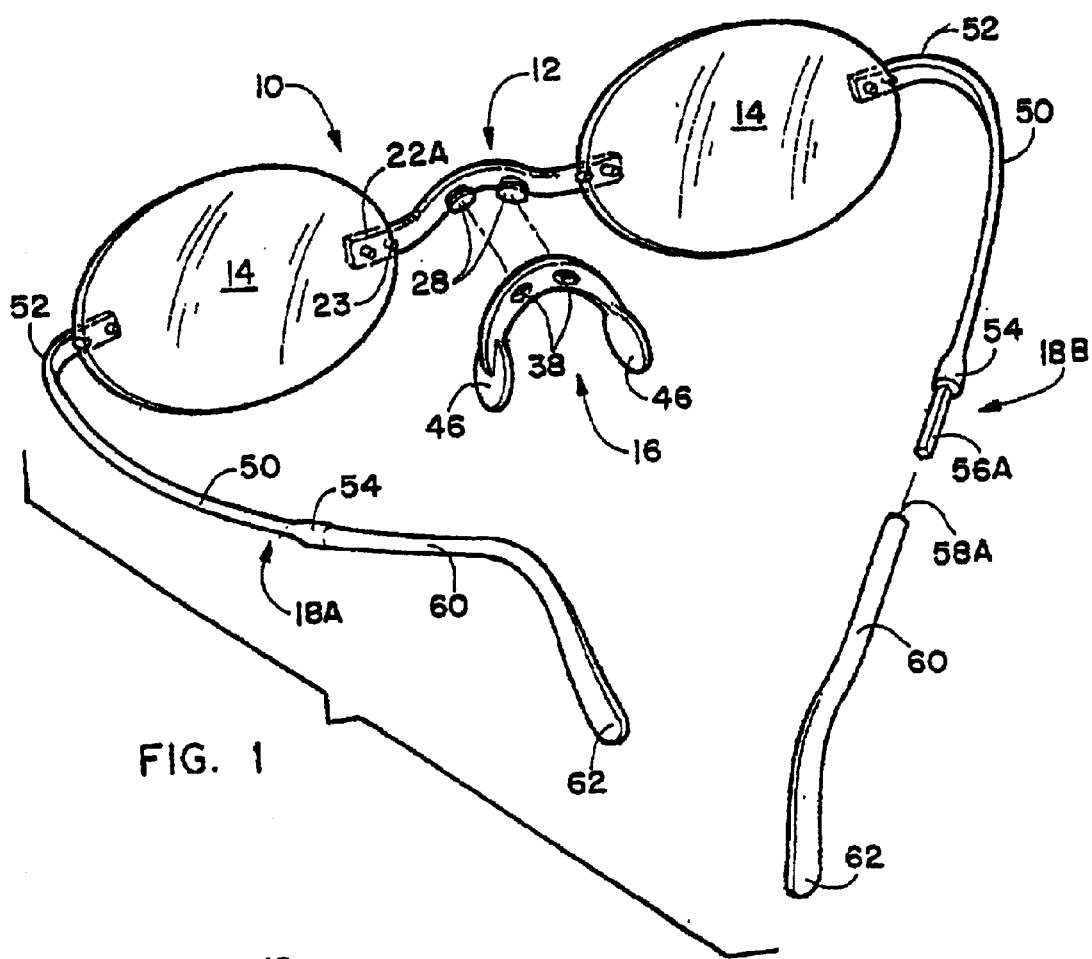
FIG. 1 depicts a perspective view of the ultra-light, hinge-less plastic eyeglass frame with the nose pad unit and the temple earpiece removed therefrom.

Referring now to the drawings, FIG. 1 shows a perspective view of the ultra-light, hinge-less plastic eyeglass frame with a nose bridge unit 12 shown attached to two oval lenses 14. It should be understood that any shape lenses may be used in conjunction with the present invention and that oval lenses are used for illustrative purposes only. A nose pad unit 16 is depicted as removed from the nose bridge unit 12 to clarify its mounting position. A first temple assembly 18A is shown assembled and a second temple assembly 18B is shown disjoined from an earpiece member 60 to reveal an interlocking, anti-rotation capability.

Figure 2:
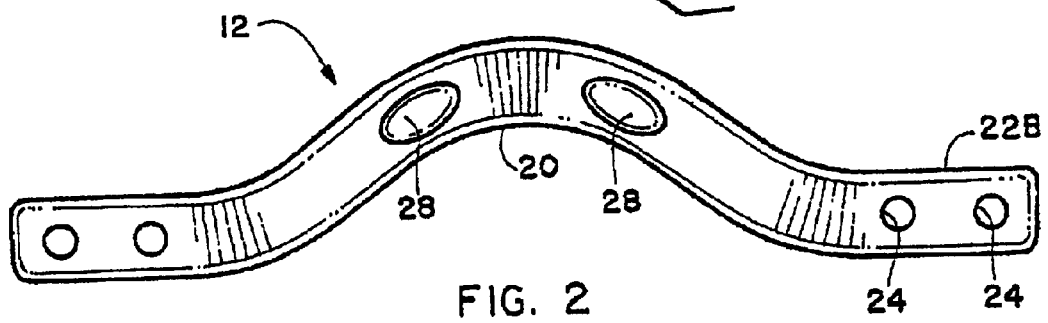
FIG. 2 depicts a rear view of the nose bridge unit.
Figure 3:
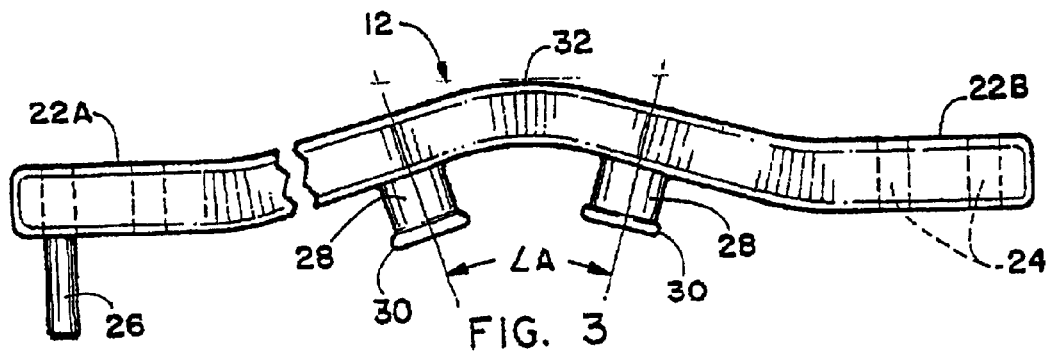
FIG. 3 depicts a top view of the nose bridge unit.

As illustrated in FIGS. 1, 2 and 3, the nose bridge unit 12 has a nose bridge lower contour 20 that positions accompanying eyeglasses properly and allows them to fit over the shape of a wearers' nose. The nose bridge unit 12 mounts to the lenses 14 at ends 22A and 22B by the means of two mounting apertures 24, at each end, and corresponding apertures in the lenses 14 such that a conventional nut and screw arrangement or barbed pin and bushing arrangement may be used to secure the attachment. Alternatively, means of attachment include one mounting aperture 24 in each of the ends 22A, 22B in combination with an integrated anti-rotation pin 26 extending from the nose bridge unit 12 and adjacent each mounting aperture 24, said anti-rotation pin 26 being inserted through one aperture, or abutted against a notch, in the lens 14 and a conventional nut and screw arrangement or barbed pin and bushing arrangement used in connection with a second aperture in the lens 14.

In a similar fashion a front temple member 50 is attached to each lens by means of two apertures in each lens 14 and two corresponding apertures in each temple member 50 such that a conventional nut and screw arrangement or barbed pin and bushing arrangement may be used to secure the attachment. Alternatively, means of attachment include one mounting aperture in each temple member 50 in combination with an integrated anti-rotation pin extending from the temple member 50 and adjacent the mounting aperture, said anti-rotation pin being inserted through one aperture, or abutted against a notch, in the lens 14 and a conventional nut and screw arrangement or barbed pin and bushing arrangement used in connection with a second aperture in the lens 14.

Two elliptically shaped mounting posts 28 with expanded heads 30 retain the nose pad unit 16 in position. The unique forward protruding contour 32 depicted in FIG. 3, illustrates an angle A of approximately thirty-five degrees (35°) formed by the mounting posts 28 extending perpendicular from the contour 32 of the nose bridge unit 12.

Figure 4:
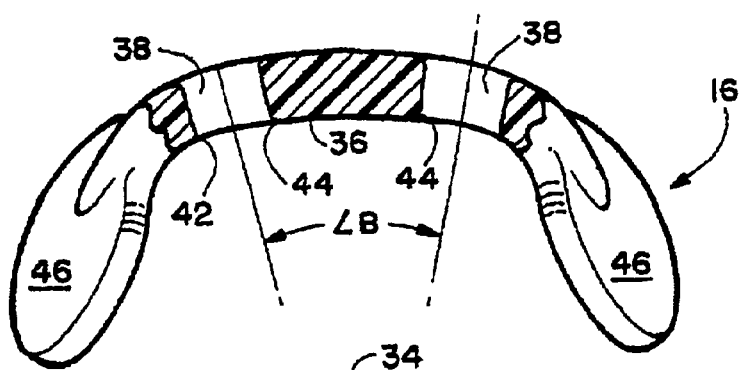
FIG. 4 depicts a top view of the nose pad unit.
Figure 5:
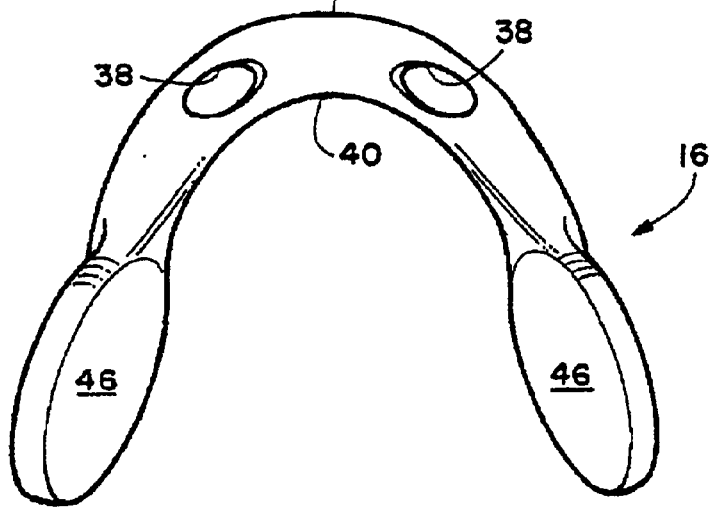
FIG. 5 depicts a rear view of the nose pad unit.

The nose pad unit 16 depicted in FIGS. 4 and 5 is comprised of a nose bridge area 34 with a rear contour 36 and nose pad mounting orifices 38 corresponding to the elliptical shape of the mounting posts 28 on the nose bridge unit 12. Angle B formed by the nose pad mounting orifices 38 and the rear contour 36 is approximately thirty degrees (30°). The difference between angle A and angle B along with the difference in the nose bridge contour 32 and the nose pad unit contour 36 creates increased locking forces when the mounting posts 28 lock into the mounting orifices 38. The locking force is created when the expanded heads 30 extend beyond inner edges 42 and 44 of said mounting orifices 38. When the nose pad unit 16 is locked to the nose bridge unit 12, the nose bridge unit 12 bends slightly so that angle A becomes equal to angle B and the mounting posts 28 insert through mounting orifices 38 locking the parts together by a pinching means. A lower contour 40 of the nose pad unit 16 matches the lower contour 20 of the nose pad bridge 12 so as to position the eyeglasses properly on a wearer's nose positioned between the nose pads 46.

Figure 6:
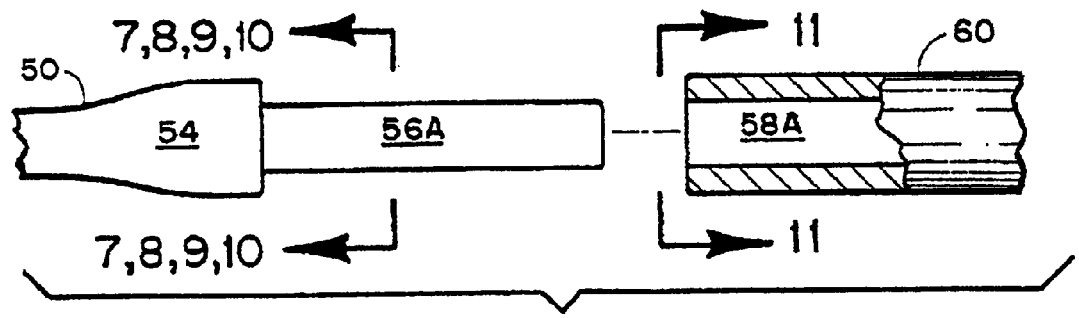
FIG. 6 depicts the temple assembly with the forward flexible temple member disjoined from the temple earpiece.
Figures 7, 8, 9, 10, 11:
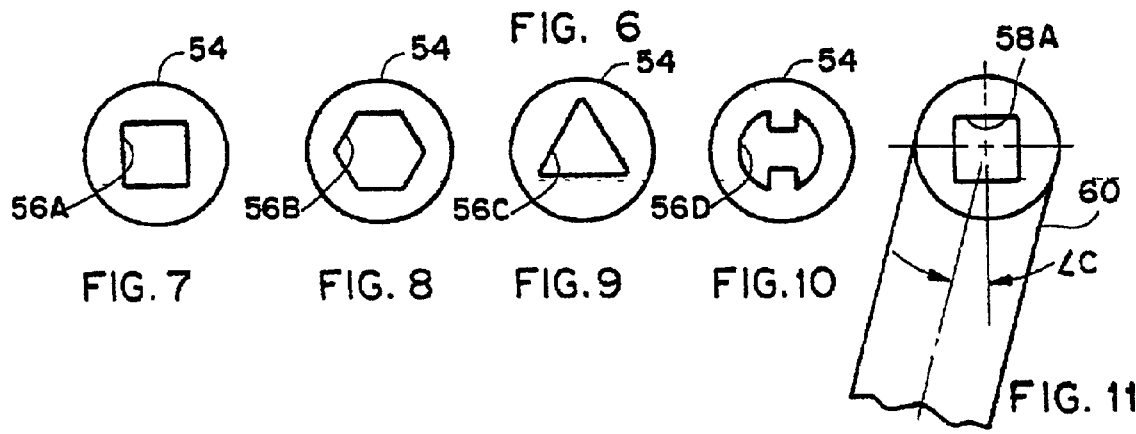
FIGS. 7, 8, 9 and 10 depict various possible configurations of the male anti-rotation end of the flexible forward temple member.
FIG. 11 depicts an end view of the temple earpiece.

Now referring to FIGS. 1, 6 and 11, each temple member 18A, 18B is comprised of two parts, namely the flexible first temple member 50 having a mounting end 52, an expanded end 54 and a temple earpiece 60. Extending from the expanded end 54 is a male anti-rotation end 56A illustrated with a square configuration, but it may be any number of geometric shapes as illustrated in FIGS. 8, 9, and 10. However, any geometric shape can be used without departing from the scope of the present invention. The male anti-rotation end 56A mates with a receiver orifice 58A having a corresponding cross-sectional shape.

The preferred and normal inclination of the temple earpiece end 62 is fifteen degrees (15°) inward toward the head of a wearer and shown as angle C in FIG. 11. The preferred angle is maintained by the curvature of the front temple members 50 and the temple earpieces 60. In a preferred embodiment, the length of the female receiver orifice 58A is equal to the length of the male anti-rotation end 56A allowing the end of the receiver orifice 58A and the anti-rotation end 56A to be trimmed by equal lengths to adjust the length of the assembled temple members 18A, 18B. A smooth seam is created by joining the temple member 50, at expanded end 54, and the temple earpiece 60 even when the length of the earpiece has been adjusted. Alternatively, only the receiver end 58A may be trimmed to shorten each temple member 18A, 18B.

While the present invention has been described herein with reference to particular embodiments thereof, a latitude of modification, various changes and substitutions are intended in the foregoing disclosure, and it will be appreciated that in some instance some features of the invention will be employed without a corresponding use of other features without departing from the scope of the invention as set forth.

I claim:

1. An eyeglass temple fabricated of memory plastic requiring no temple hinge member including:
    a first end of a temple member having means for directly attaching to an eyeglass lens at a location opposite a nose bridge member attachment to said lens, a second open end of said temple member containing a first end of an elongated anti-rotation member which extends therefrom; and
    a temple earpiece having an orifice at a first end which receives said extended portion of said anti-rotation member thereby forming said eyeglass temple, said earpiece fabricated to angle inward to follow a curvature of a wearer's head.

2. The eyeglass temple according to claim 1 wherein said earpiece angle is within a range of five to twenty degrees.

3. The eyeglass temple according to claim 1 wherein a depth of said earpiece orifice is equal to or greater than a length of said anti-rotation member.

4. The eyeglass temple according to claim 1 wherein said temples may be permanently shortened by removing a portion of the earpiece orifice depth.

5. The eyeglass temple according to claim 1 wherein said temples may be permanently shortened by removing equal portions of the anti-rotation member and the earpiece orifice depth.

6. The eyeglass temple according to claim 1 wherein said anti-rotation member has a rectangular cross-section.

7. The eyeglass temple according to claim 1 wherein said anti-rotation member has a triangular cross-section.

8. The eyeglass temple according to claim 1 wherein said anti-rotation member has a polygonal cross-section.

9. The eyeglass temple according to claim 1 wherein said means for directly attaching said temple member to an eyeglass lens includes one or more apertures in said lens and one or more corresponding apertures in the first end of said temple member facilitating insertion of one or more screws through said one or more lens and temple apertures, said one or more screws secured by a nut.

10. The eyeglass temple according to claim 1 wherein said means for directly attaching said temple member to an eyeglass lens includes one or more apertures in said lens and one or more corresponding apertures in the first end of said temple member facilitating insertion of one or more bushings through said one or more lens and temple apertures, said one or more bushings engage one or more received barbed pins.

11. The eyeglass temple according to claim 1 wherein said second end of the temple member has sufficiently the same dimensions as the first end of the temple earpiece for creating a smooth connection between the temple member and the earpiece.

12. An eyeglass frame including:
    means for an elongated nose bridge member to attach and join two eyeglass lenses;
    a first end of a temple member having means for directly attaching to an eyeglass lens at a location opposite the nose bridge member attachment to said lens, a second open end of said temple member containing a first end of an elongated anti-rotation member which extends therefrom; and
    a temple earpiece having an orifice at a first end which receives said extended portion or said anti-rotation member thereby forming said eyeglass temple, said earpiece fabricated to angle inward to follow a curvature of a wearer's head.

13. The rimless eyeglass frame according to claim 12 wherein said nose bridge member includes means for receiving an interchangeable nose pad unit.

14. The eyeglass frame according to claim 12 wherein said means for receiving a nose pad unit is one or more posts having enlarged heads extending rearward from said nose bridge member.

15. The eyeglass frame according to claim 14 wherein said nose pad unit is contoured to fit over a nose, said nose pad unit having two nose pads which rest on opposite sides or the nose and one or more openings near an upper area, said openings corresponding to, and engaging, said enlarged heads of the one or more posts.

16. The eyeglass frame according to claim 14 wherein said nose bridge member includes a contoured mid-section directed forward such that the posts are not parallel but each face inwardly defining an angle.

17. The eyeglass frame according to claim 15 wherein said openings in said nose pad unit face inwardly defining an angle, said angle defined by the nose pad openings being less than an angle defined by the mounting posts.

18. The eyeglass frame according to claim 12 wherein said means for attaching said nose bridge member to eyeglass lenses includes one or more apertures in said lenses and one or more corresponding apertures in both ends of said elongated nose bridge member facilitating insertion of one or more screws through said one or more lens and nose bridge apertures, said one or more screws secured by a nut.

19. The eyeglass frame according to claim 12 wherein said means for attaching said nose bridge member to eyeglass lenses includes one or more apertures in said lenses and one or more corresponding apertures in both ends of said elongated nose bridge member facilitating insertion of one or more bushings through said one or more lens and nose bridge apertures, said one or more bushings engage one or more received barbed pins.

20. The eyeglass frame according to claim 12 wherein said second end of each temple member has sufficiently the same dimensions as the first end of the temple earpiece for creating a smooth connection between the temple member and the earpiece.

21. The eyeglass frame according to claim 12 wherein said earpiece angle is within a range of five to twenty degrees.

22. The eyeglass frame according to claim 12 wherein a depth of said earpiece orifice is equal to or greater than a length of said anti-rotation member.

23. The eyeglass frame according to claim 12 wherein said temples may be permanently shortened by removing a portion of the earpiece orifice depth.

24. The eyeglass frame according to claim 12 wherein said temples may be permanently shortened by removing equal portions of the anti-rotation member and the earpiece orifice depth.

25. The eyeglass frame according to claim 12 wherein said anti-rotation member has a rectangular cross-section.

26. The eyeglass frame according to claim 12 wherein said anti-rotation member has a triangular cross-section.

27. The eyeglass frame according to claim 12 wherein said anti-rotation member has a polygonal cross-section.

28. A method for fabricating eyeglass temples of memory plastic comprising:
   a) creating a left and right front temple member each having at a first end means for direct attachment to a distinct eyeglass lens, said second open ends of said front temple members containing a first end of an anti-rotation member extending therefrom;
   b) creating a left and right temple earpiece having an orifice at a first end, said earpieces angled toward a wearer's head; and
   c) inserting said extended anti-rotation members into said orifice of said earpieces creating a left and right temple.

29. The method according to claim 28 wherein said front temple members are formed to extend outwardly from said lenses and contour in the direction of a wearer's head.

30. The method according to claim 28 wherein said means for directly attaching said temple member to an eyeglass lens includes one or more apertures in said lens and one or more corresponding apertures in the first end of said temple member facilitating insertion of one or more screws through said one or more lens and temple apertures, said one or mare screws secured by a nut.

31. The method according to claim 28 wherein said means for directly attaching said temple member to an eyeglass lens includes one or more apertures in said lens and one or more corresponding apertures in the first end of said temple member facilitating insertion or one or more bushings through said one or more lens and temple apertures, said one or more bushings engage one or more received barbed pins.

* * * * *

UNITED STATES PATENT AND TRADEMARK OFFICE
CERTIFICATE OF CORRECTION

PATENT NO. : 6,719,425 B2
DATED : April 13, 2004
INVENTOR(S) : William A. Conner Page 1 of 1

It is certified that error appears in the above-identified patent and that said Letters Patent is hereby corrected as shown below:

Column 6,
Line 11, change "or" to -- of --

Column 8,
Line 9, change "mare" to -- more --
Line 15, change "or one" to -- of one --

Signed and Sealed this

Twenty-second Day of February, 2005

JON W. DUDAS
*Director of the United States Patent and Trademark Office*